Feb. 12, 1929.

E. J. W. RAGSDALE ET AL 1,701,862

BRAKING MECHANISM FOR STEERING WHEELS

Filed April 3, 1924    5 Sheets-Sheet 1

INVENTOR.

EARL J. W. RAGSDALE
AND GUSTAVE A. HAEDERER.
BY
ATTORNEY.

Feb. 12, 1929.　　　　　　　　　　　　　　　　　　　　1,701,862
E. J. W. RAGSDALE ET AL
BRAKING MECHANISM FOR STEERING WHEELS
Filed April 3, 1924　　　　5 Sheets-Sheet 2

Fig 2

INVENTOR.
EARL J. W. RAGSDALE
AND GUSTAVE A. HAEDERER.
BY
ATTORNEY.

WITNESS
Walter M. Trout.

Feb. 12, 1929. 1,701,862
E. J. W. RAGSDALE ET AL
BRAKING MECHANISM FOR STEERING WHEELS
Filed April 3, 1924 5 Sheets-Sheet 3

INVENTOR.
EARL J. W. RAGSDALE
AND GUSTAVE A. HAEDERER
BY
ATTORNEY.

Fig 10

Patented Feb. 12, 1929.

1,701,862

UNITED STATES PATENT OFFICE.

EARL J. W. RAGSDALE, OF NORRISTOWN, AND GUSTAVE A. HAEDERER, OF PHILADELPHIA, PENNSYLVANIA, ASSIGNORS TO BUDD WHEEL COMPANY, OF PHILADELPHIA, PENNSYLVANIA, A CORPORATION OF PENNSYLVANIA.

BRAKING MECHANISM FOR STEERING WHEELS.

Application filed April 3, 1924. Serial No. 703,999.

Our invention relates to improvements in braking mechanism for steering wheels.

The chief object of our invention is to provide a braking mechanism, for the front or steering wheels of motor vehicles, which is substantially housed within the wheel so that it is not in position to be subjected to the mud and dirt thrown or splashed up by the wheel as it rolls along the road.

It is also an object of our invention to provide a braking mechanism for a front wheel, which swivels around a substantially vertical axis, in which the braking mechanism is arranged in line with this axis and also substantially in the vertical plane through the point of contact of the wheel with the ground.

It is a further object of our invention to provide a braking mechanism for the swiveled steering wheels of motor vehicles, of such a character that continued rotation of the wheel, after the brakes have been partially applied, assists the braking effort of the operator and tends to apply the brakes with greater force.

It is also an object of our invention to provide a braking mechanism of the character above stated which may be housed substantially within the wheel so that it is protected from dirt or mud thrown up or splashed by the wheel and to provide operating connections for such a braking mechanism which are not affected by the swiveling movement of the wheel about its vertical axis.

It is an object of our invention to provide a front wheel braking mechanism in which the partial application of the brakes causes the continued rotation of the wheel to automatically increase the braking effect, so that the wheel is quickly brought to rest, and in which this braking mechanism is of such a character that it may be substantially housed within the wheel, in line with the vertical axis around which the wheel swivels, and lying substantially in the vertical plane through the point of contact of the wheel with the ground.

A further object of our invention is to provide simple but adequate means for actuating front wheel brakes.

A further object of our invention is to provide simple means for regulating or adjusting front wheel brakes, which adjusting means are such that they are readily accessible so that adjustment may be made without removing the brake drum or dust cover.

Further objects, and objects relating to details and economies of construction and operation, will definitely appear from the detailed description to follow. In one instance, we accomplish the objects of our invention by the devices and means described in the following specification. Our invention is clearly defined and pointed out in the appended claims. A structure constituting a preferred embodiment of our invention is illustrated in the accompanying drawing, forming a part of this specification, in which

In the drawings, the same reference numerals refer to the same parts throughout the several views and the sectional views are taken looking in the direction of the arrows at the ends of the section lines.

In general, we accomplish the objects of our invention by providing a brake-actuating mechanism which cooperates with a brake drum secured to the wheel hub and is so located that the brake shoes co-act with the brake drum substantially in line with the vertical axis on which the wheel hub is swiveled. We find it very desirable, also, that the brakes should co-act with the brake drum substantially in line with the vertical plane through the point of contact of the wheel with the ground, as this provides a construction in which the stresses on the parts are reduced to a minimum and in which the braking mechanism is effectively protected and shielded from the water, mud or dust thrown up or splashed up by the wheel as it rolls along the ground. We find it desirable to provide a braking mechanism which is actuated by a vertically-movable thrust cap located in line with the vertical axis about which the wheel swivels. Because of this location of the thrust cap, the breaking mechanism is not affected by swiveling movement of the hub around its vertical axis. We propose to provide a braking mechanism which is not positively anchored but is of such a character that, when the brakes are partially applied, the brake band tends to wrap around and move with the drum and the continued rotation of the wheel tends to increase the braking effort and automatically applies the brakes more effectively. We propose to provide a floating brake band which is normally retracted from engagement with the brake drum but which may be forced into engagement with such brake drum by suitable mechanism actuated, for instance, by the vertically movable thrust cap referred to. We propose to provide suitable anchor members arranged in position to be engaged by parts of the brake band so that, when the brake band begins to grip the brake drum, the continued rotation of the wheel brings a part of the brake band into engagement with these anchor members and tends to force the brake band into still more effective braking engagement with the brake drum. We propose to provide toggle linkage connecting the free ends of the brake band and operated by a lever which is actuated by the vertically-movable thrust cap. We also propose to provide resilient means which normally retain a part of the brake band in engagement with these anchor members. The purpose of this is to prevent unnecessary noise when the brakes are applied. We propose to actuate the vertically-movable thrust cap by providing it with an internal screw thread meshing with a corresponding thread formed on a stationary part in line with the king pin upon which the hub of the wheel is swiveled. We propose to provide a suitable operating arm by means of which this thrust cap may be rotated around the vertical axis of the king pin so that this rotation, due to the screw thread above mentioned, will cause vertical movement of the thrust cap. In order to provide for ready adjustment of the braking mechanism, we may provide an adjustable connection between the actuating arm and the rotatable thrust cap.

In the accompanying drawings, we have illustrated a braking mechanism which is constructed in accordance with our invention and constitutes one embodiment thereof. This braking mechanism has been found to work very satisfactorily. Referring to the numbered parts of the drawings in which this braking mechanism is illustrated, the axle, 10, in the form illustrated in Fig. 1, has its outer end forked, at 11. A hub support, 12, is mounted upon the substantially vertical trunnions, 13 and 14, carried by the forked end of the axle, so as to swivel around the substantially vertical axis defined by the said trunnions. The lower portion of the hub support, 12, is enlarged, at 15, and provided with a recess, 16, which receives the lower fork arm, 11, of the axle. The hub, 19, of the wheel, has a horizontally extended spindle which is journaled within the hub support, 12, by means of the tapered roller bearings, 17 and 18, so as to rotate around a substantially horizontal axis. The wheel hub is retained in place by means of the nut, 21, screwed on the end of the spindle and engaging one race of the bearing, 18. The adjacent end of the hub support, 12, may be closed by the removable cap, 22. The hub, 19, is provided with a flange to which the demountable wheel, 23, is secured by means of the convex nuts, 24, screwed on the studs, 25, projecting from the hub flange and engaging in concave recesses formed in the wheel disc. It is to be noted that the demountable wheel, 23, comprises a concave disc which is fastened to the hub flange to one side of the vertical plane through the point of contact of the wheel tread with the ground, so that the end of the axle and the braking mechanism are both housed within and protected by the wheel.

Figure 1:
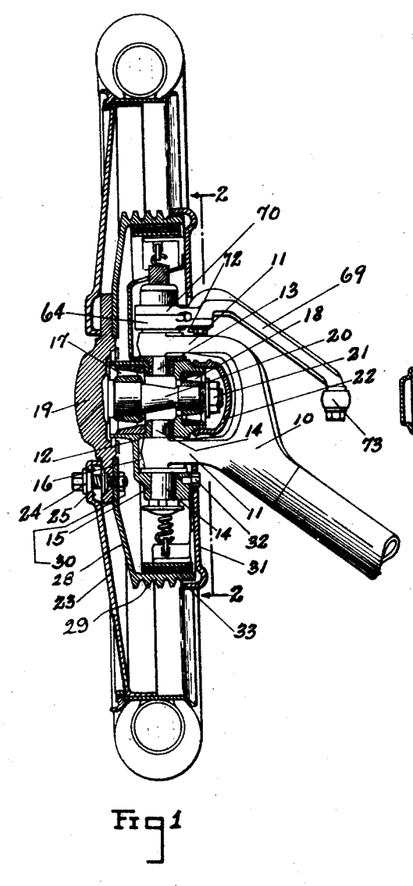
Fig. 1 is a vertical, sectional view through a front wheel mounted on one end of a front axle of a motor vehicle, showing our improved braking mechanism applied thereto.
Figure 6:
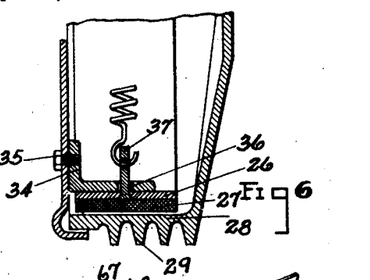
Fig. 6 is a detail, sectional view, taken on the line 6—6 of Fig. 2 and showing a guide means for the brake band.
Figure 7:
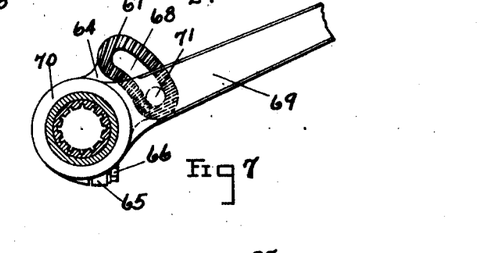
Fig. 7 is a detail, sectional view, taken on the line 7—7 of Fig. 3 and showing the brake adjusting means.
Figure 8:
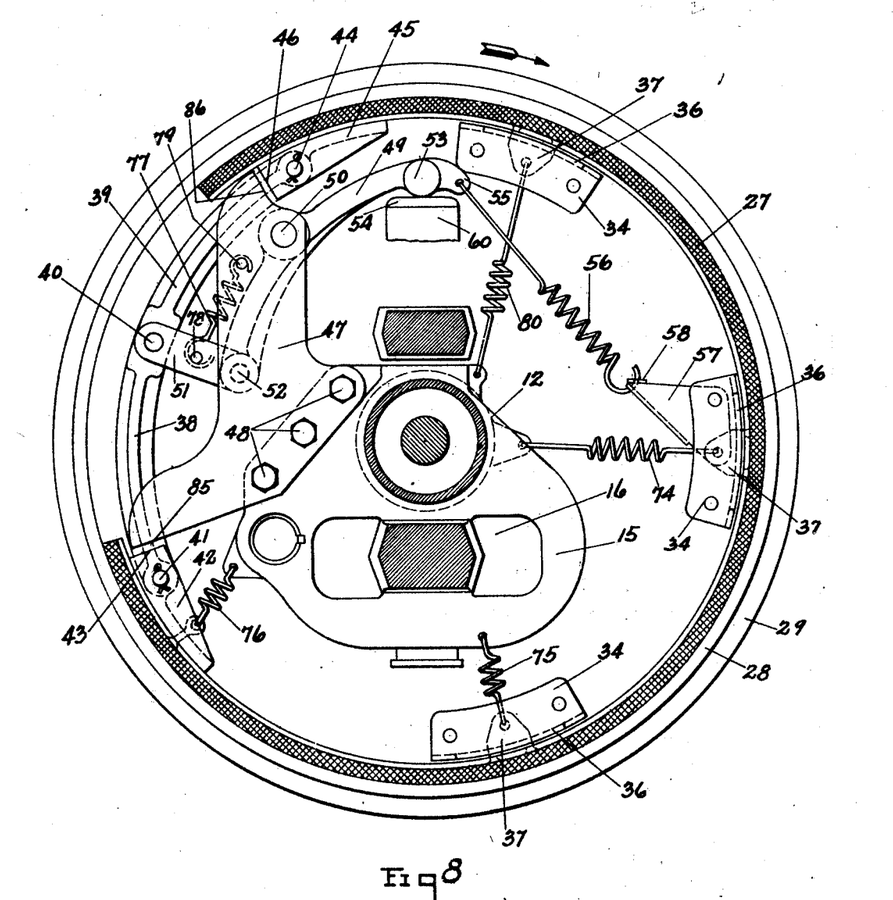
Fig. 8 is a view showing the toggle and lever in the brake-applying position.
Figure 9:
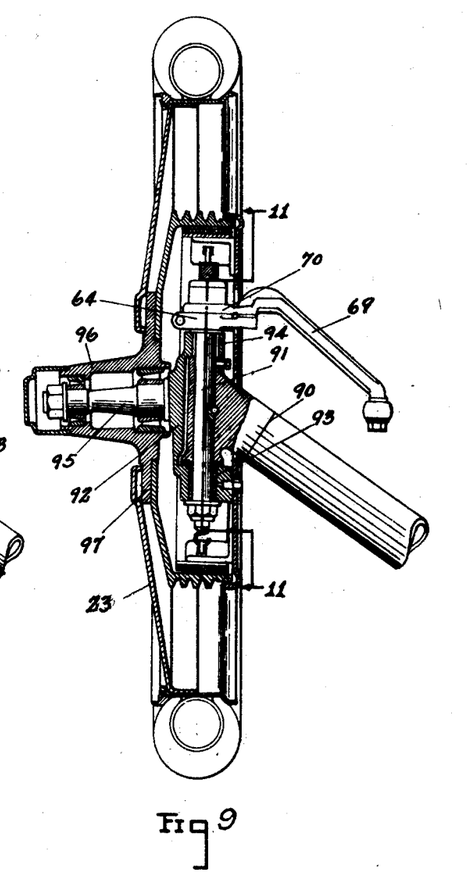
Fig. 9 is a vertical, sectional view showing our improved brake mechanism applied to a different type of front axle.
Figure 10:
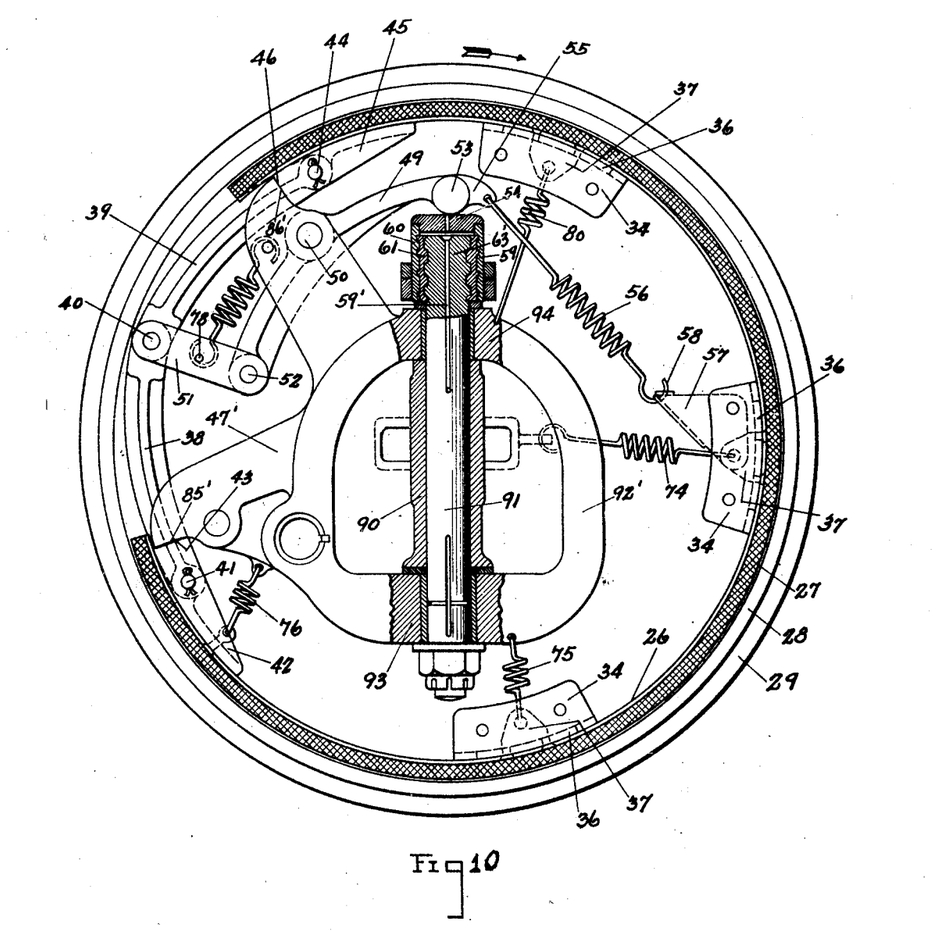
Fig. 10 is a view taken on the line 11—11 of Fig. 9 with the dust cover removed.

A brake drum, 28, is secured to the flange of the hub, 19, by means of nuts, 30, screwed on the studs, 25. The periphery of the drum may be provided with fins, 29, to facilitate the cooling of the drum, if desired. A brake band, 26, comprising a split ring having a lining, 27, of braking material applied to the exterior thereof, cooperates with the inner surface of the brake drum, 28. A dust cover, 31, secured to the hub support, 12, by means of the stud bolts, 32, closes the open side of the brake drum, as shown in Figs. 1 and 10. This dust cover may have a peripheral flange, 33, overlying the periphery of the brake drum. The series of angle brackets, 34, are secured to the dust cover, 31, by means of the screws, 35, (Fig. 6) and these brackets have slots, 36, formed therein through which extend the lugs, 37, secured to the brake band, 26. This arrangement provides a guide for the brake band and a floating support therefor which permits a limited movement of the brake band with reference to the hub support, 12, and the dust cover, 31.

Figure 2:
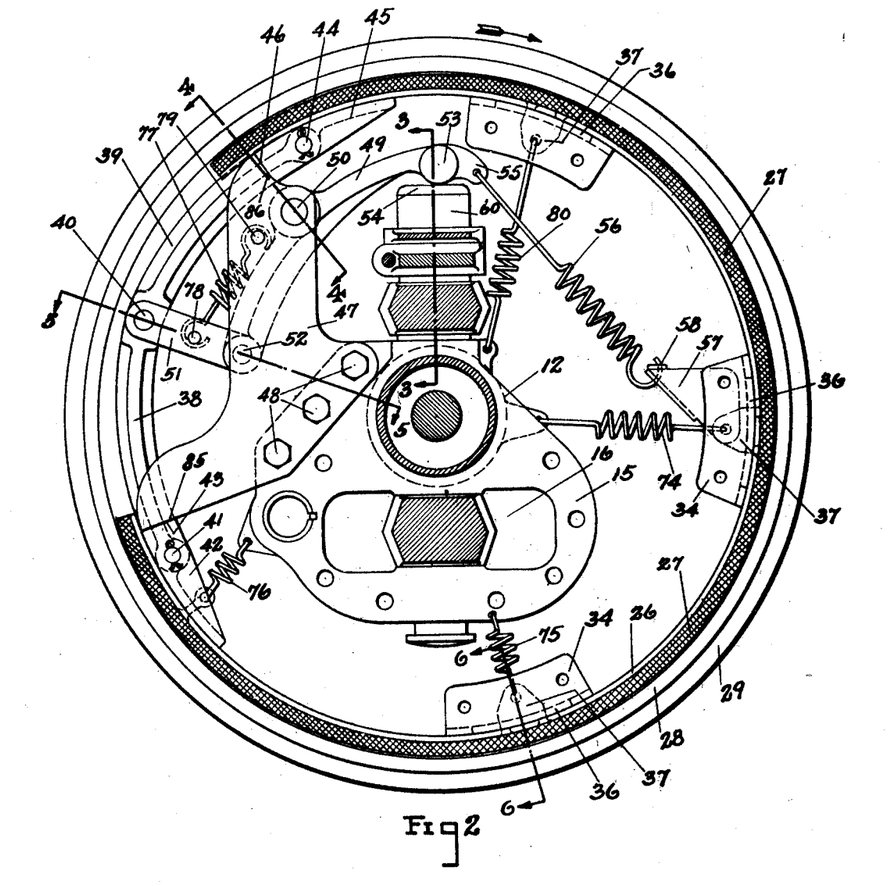
Fig. 2 is a sectional view taken on the line 2—2 of Fig. 1, the dust cover being removed.
Figure 3:
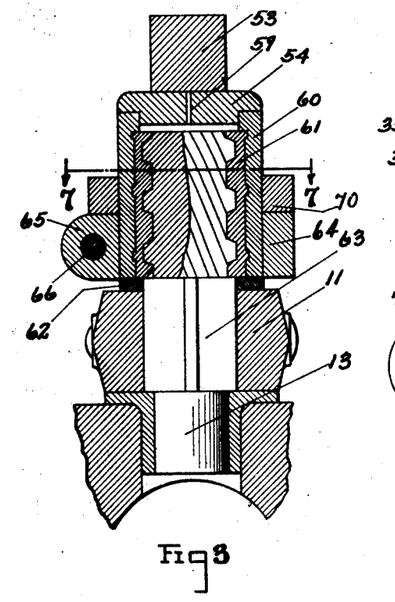
Fig. 3 is a detail, sectional view of the lever-operating cap, taken on the line 3—3 of Fig. 2.
Figure 4:
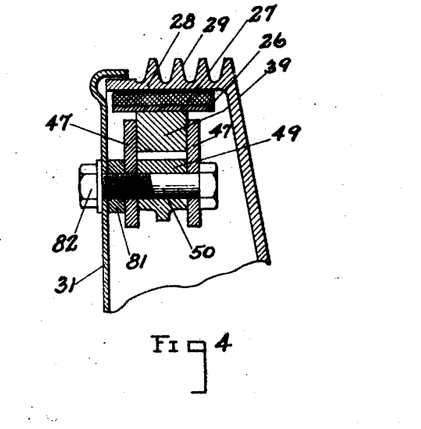
Fig. 4 is a detail, sectional view taken on the line 4—4 of Fig. 2 and showing the fulcrum of the toggle-actuating lever.
Figure 5:
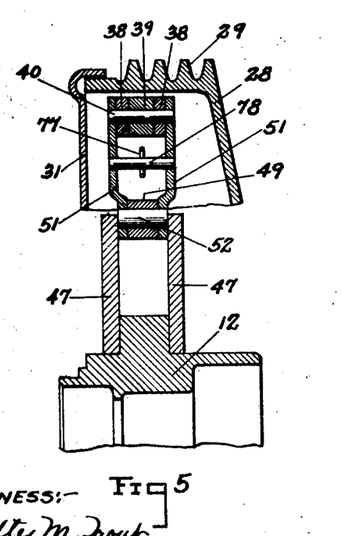
Fig. 5 is a detail, sectional view, taken on the line 5—5 of Fig. 2, showing the connection between the toggle-actuating lever and the toggle linkage.

The free ends of the brake band are connected by a toggle linkage consisting of the links, 38 and 39, which are pivotally connected by the pin, 40. The opposite end of the link, 38, is pivoted, at 41, to a bracket, 42, secured to the corresponding end of the brake band, 26, said bracket having a shoulder, 43, for engagement with the anchor plates hereinafter to be described. Similarly, the opposite end of the link, 39, is pivotally connected, at 44, to a bracket, 45, secured to the corresponding end of the brake band, 26, and having a shoulder, 46, for engagement with the said anchor plates. The anchor plates, 47, two in number, are secured to the hub support, 12, by means of the bolts, 48, said anchor plates being spaced from each other, as shown in Fig. 5. The anchor plates, 47, have the radially extending fingers, 85 and 86, one of said fingers being adapted to engage one of the shoulders, 43 or 46, upon the application of the brakes. A lever, 49, works between the anchor plates, 47, and is pivotally mounted on said plates by means of the bolt, 50, as shown in Figs. 2 and 4. The bolt, 50, also extends through a spacing nut, 81, and may extend also through the dust cover, 31, and have a nut, 82, secured thereon to assist in retaining the dust cover in place. One end of the lever, 49, is pivotally connected, at 52, to a link, 51, the opposite end of said link being pivotally connected to the toggle linkage by means of the pivot pin, 40, as shown in Fig. 5. The opposite end of the lever, 49, is provided with an operating head, 53, for engagement with the head, 54, of an actuating cap, 60, mounted in line with the vertical axis around which the wheel swivels. This arm of the lever, 49, also has an extension, 55. One end of a spring, 56, is connected to this extension, 55, and the other end of said spring is connected, at 58, to a bracket, 57, secured to one of the brackets, 34, carried by the dust cover.

The trunnion, 13, extends through the upper arm, 11, of the forked end of the axle, having a squared portion, 63, engaging in said upper fork to prevent rotation of the trunnion with respect thereto. The upper end of this trunnion, above said fork arm, 11, is provided with a screw thread 62, of comparatively steep pitch, and actuating the cap, 60. The cap 60, has cast within it a sleeve, 61, of bearing metal, provided with screw threads corresponding to those on the part, 62, of the trunnion. A passage, 59, may be provided through the head, 54, to permit the lubrication. An adjusting plate, 64, has a split sleeve, 65, which embraces the lower portion of the cap, 60, being clamped thereon by means of the bolt, 66. This adjusting plate has a serrated surface, 67, provided with an arcuate slot, 68, therein. An actuating arm, 69, has a boss, 70, at one end, which is freely mounted upon the cap, 60. The lower surface of the arm, 69, is also serrated so as to cooperate with the serrated surface, 67, of the adjusting plate, and a screw threaded stud, 71, on the actuating arm, 69, projects through the slot, 68, of the adjusting plate. This provides for the ready adjustment of the actuating arm with respect to the cap, 60, and the arm may be clamped in adjusted position by means of the nut, 72, on the lower end of the stud, 71. This provides for a ready adjustment of the brake mechanism, which may be made without removing the dust cover. The end, 73, of the actuating arm may be connected to any suitable mechanism for moving said arm so as to rotate the actuating cap, 60.

A series of springs, 74, 75, 76 and 80, are provided for retracting the brake band and withdrawing it from engagement with the brake drum. These springs are connected to the lugs, 37, on the brake band, and to the hub support, 12. A spring, 77, is connected at one end to a pin, 78, carried by the link, 51, and the opposite end of said spring is connected to a pin, 79, carried by the anchor plates, 47. This spring tends to hold the shoulder, 43, on the brake band bracket, 42, in engagement with the fingers, 85, of the anchor plates, 47.

In Figs. 10 and 11 we have shown our invention applied to a different type of axle. In this modified form, the axle, 90, carries a substantially vertical king pin, 91. A spindle member, 92, is forked and has its upper arm, 94, and its lower arm, 93, swiveled upon the upper and lower ends, respectively, of the king pin, 91. This spindle member carries a tapered spindle, 95, upon which the wheel hub, 96, is journaled by means of suitable roller bearings. The dust cover, 31, is secured to this spindle member, 92, as shown in Fig. 10. The hub support or spindle member, 92, is, in this instance, provided with the integral portions, 47′, having the fingers, 85′ and 86′, which are the full equivalent of the anchor plates, 47, heretofore described.

The upper end of the king pin, 91, has an externally screw threaded portion, 63′, and the thrust cap, 60, has cast therein a bearing sleeve, 61, having internal screw threads fitting this screw threaded portion of the king pin. A wear plate, 54, closes the upper end of the thrust cap, and is provided with a central passage, 59, therethrough, through which lubricant may be injected for lubricating these screw threads.

The king pin may also be provided with a lubricating passage, 59', so that lubricating oil may also be passed through the opening, 59, and flow to the king pin bearings so that both the screw threads and the king pin bearings may be lubricated through the hole in the wear plate. This makes the lubrication of this brake mechanism a very simple proposition. The other parts of the brake mechanism, shown in Figs. 10 and 11, are substantially the same as those illustrated in the other figures of the drawing and, hence, their description will not be repeated here.

From the description of the parts given above, the operation of this mechanism should be very readily understood. It will be observed that the brake band, 27, is a floating brake member inasmuch as it is not positively connected either to the drum or the hub support, but is permitted to have a limited circumferential movement with respect to the drum. This brake mechanism is housed within the convex disc, 23, of the demountable wheel, and the mechanism is so arranged that the wheel contacts with the ground in line with the vertical axis around which the wheel swivels, and the brake band also engages the brake drum substantially in line with said axis. Due to the way in which the braking action is lined up, the side stresses and strains are reduced to a minimum with the result that strains upon the axle construction are materially lessened. It is also important to note that the braking mechanism is housed within the wheel so that it is protected to a great extent from the mud, slush and dirt, which may be thrown up by the wheel as it rolls along the ground. When the driver wishes to apply the brakes, the arm, 69, is actuated through suitable connections so as to rotate the thrust cap, 60. Due to the screw threaded engagement between this thrust cap and the trunnion upon which it is mounted, the thrust cap moves vertically upward. Since one end of the lever, 49, engages this thrust cap, this vertical movement will rock the lever, 49, on its pivot, 50, and straighten out the toggle linkage composed of the links, 38 and 39, forcing the free ends of the brake band, 27, away from each other and into engagement with the internal surface of the brake drum, 28. As soon as the brake band is brought into frictional engagement with the drum, the rotation of the wheel tends to carry the brake band along with it. As already stated, the brake band is mounted so that it is permitted a limited circumferential movement with respect to the drum and the hub support. When the brake drum carries the brake band along with it in its rotation, one of the brackets, 43 or 46, upon the brake band, engages one or the other of the abutments, 85 and 86, on the anchor plates, 47, the latter being carried by and fastened to the hub support. As soon as one of these brackets engages the corresponding abutment, the further movement of the brake band in that direction is prevented, and the reaction, due to the engagement of this bracket with the abutment, will be to expand the brake band still further and force it into tighter engagement with the brake drum, thus increasing the brake pressure automatically and assisting in bringing the rotation of the wheel to a stop. For instance, if the brake drum is rotating in the direction indicated by the arrow in Fig. 2, when the brakes are applied, this motion will cause the shoulder, 43, to engage the abutment, 85, and prevent further movement of this end of the brake band. The frictional engagement of the remaining portion of the brake band with the brake drum will cause it to wrap around the brake drum and to expand into tighter gripping engagement therewith. The spring, 77, tends to hold the brake band in such a position that the shoulder, 43, is normally in engagement with the abutment, 85, and, since the arrow indicates the direction of forward rotation of the wheel, this prevents any click or objectionable noise caused by the shoulder coming into contact with the corresponding abutment when the brakes are applied while the vehicle is moving forward. The spring, 56, normally holds the head, 53, of the lever, 49, in engagement with the thrust cap, 60. The lubrication of the parts is permitted through the passages, 59, in the end of the thrust cap, as has already been described. The brake mechanism may be adjusted very conveniently by means of the member, 64, having the slot, 68, in which the pin, 71, upon the operating arm, moves.

We are aware that the embodiment of our invention, which has been illustrated in the accompanying drawings, is susceptible of considerable variation without departing from the spirit of our invention, and, therefore, we desire to claim our invention broadly, as indicated by the appended claims.

Having thus described our invention, what we claim as new and useful and desire to secure by Letters Patent is—

1. The combination of an axle, a hub support swiveled at the end of said axle around a substantially vertical axis, a hub journaled on said hub support, a wheel carried by said hub and contacting with the ground in line with the vertical axis around which the hub support swivels, a brake drum carried by said hub, a brake member mounted for bodily movement circumferentially of the drum and adapted to engage said drum in line with said vertical axis, an abutment fixed with respect to said brake member, means for actuating said brake member, and means comprising the contact of a portion of said brake member with said abutment whereby continued rotation of the wheel, after said brake member engages the drum, automatically increases the braking pressure exerted by said member.

2. The combination of an axle, a hub support swiveled at the end of said axle around a substantially vertical axis, a hub journaled on said hub support to rotate around a substantially horizontal axis, a demountable wheel detachably secured to said hub and contacting with the ground in line with said vertical axis, a brake drum carried by said hub and housed within the wheel, a brake member mounted for bodily movement circumferentially of the drum adapted to engage said drum in line with said vertical axis, an abutment fixed with respect to said brake member, means for actuating said brake member, and means comprising the contact of a portion of said brake member with said abutment, whereby continued rotation of the wheel, after said brake member engages the drum, automatically increases the braking pressure exerted by said member.

3. The combination of an axle, a hub support swiveled at the end of said axle around a substantially vertical axis, a hub journaled on said hub support to rotate around a substantially horizontal axis, a wheel carried by said hub, a brake drum carried by said hub, a brake band having means thereon affording a limited circumferential movement thereto with respect to said drum, means for actuating said brake band, an abutment fixed with respect to the hub support and adapted to be engaged by a part of said brake band, and means for holding a part of said brake band in contact with said abutment.

4. The combination of an axle, a hub support swiveled at the end of said axle around a substantially vertical axis, a hub journaled on said hub support to rotate around a substantially horizontal axis, a wheel carried by said hub, a brake drum carried by said hub, a brake band having means thereon affording a limited circumferential movement thereto with respect to said drum, means for expanding said band into braking engagement with said drum, an abutment fixed with respect to said hub support and adapted to be engaged by a part of said brake band, and spring means for holding a part of said brake band in contact with said abutment.

5. The combination of an axle, a hub supported swiveled at the end of said axle around a substantially vertical axis, a hub journaled on said hub support to rotate around a substantially horizontal axis, a wheel carried by said hub, a brake drum carried by said hub, a brake band having means thereon affording a limited circumferential movement thereto with respect to said drum, means for expanding said band, and abutments engaged by portions near the end of said band upon frictional movement of the band in either direction from normal position, and means normally holding a portion of said band in contact with one of said abutments.

6. The combination of an axle, a hub support swiveled at the end of said axle around a substantially vertical axis, a hub journaled on said hub support to rotate around a substantially horizontal axis, a wheel carried by said hub, a brake drum carried by said hub, a brake band mounted to have a limited circumferential movement with respect to said drum, means for expanding said band into engagement with the drum, abutments fixed with respect to the hub support and adapted to be engaged by portions near the end of said band upon circumferential movement of the band in either direction from normal position, and spring means normally holding the band in a position such that it engages only one of said abutments.

7. The combination of an axle, a substantially vertical trunnion carried by said axle, a wheel swiveled on said trunnion, a brake drum moving with the wheel, a brake band co-acting with said drum, a toggle linkage interposed between the free ends of said brake band, a thrust cap movable vertically on said trunnion, means for moving said cap, and lever connections between said cap and toggle linkage, said toggle linkage, thrust cap and lever connections being disposed in substantially the same vertical plane.

8. The combination of an axle, a substantially vertical trunnion carried by said axle, a wheel swiveled on said trunnion, a brake drum moving with the wheel, a brake band co-acting with said drum, a toggle linkage interposed between the free ends of said brake band, a thrust cap movable vertically on said trunnion, a lever engaging said thrust cap and connected to said toggle linkage, said toggle linkage, thrust cap and lever connections being disposed in substantially the same vertical plane, and means for moving said cap.

9. The combination of an axle, a substantially vertical trunnion carried by said axle, a wheel swiveled on said trunnion, a brake drum moving with the wheel, a brake band co-acting with said drum, a toggle linkage interposed between the free ends of said brake band, a thrust cap movable vertically on said trunnion, a lever engaging said thrust cap, a link connecting one end of said lever and the toggle linkage, said toggle linkage, thrust cap and lever connections being disposed in substantially the same vertical plane, and means for moving said cap.

10. The combination of an axle, a substantially vertical trunnion carried by said axle, a wheel swiveled on said trunnion, a brake drum moving with the wheel, a brake band co-acting with said drum, a thrust cap movable vertically on said trunnion, a toggle linkage interposed between the free ends of said brake band, a lever having one end engaging said thrust cap, a link connecting the opposite end of said lever and the toggle linkage, a spring connected to the end of said lever which engages the thrust cap, and means for moving said thrust cap.

11. The combination of an axle, a hub support swiveled at the end of said axle around a substantially vertical axis, a wheel journaled on said hub support to rotate around a substantially horizontal axis, a brake drum moving with said wheel, a brake band co-acting with said drum, a toggle linkage interposed between the free ends of said band, an anchor plate carried by said hub support and having portions constituting abutments adapted to be engaged by portions of the brake band, a thrust cap movable vertically in line with the vertical axis on which the wheel swivels, a lever fulcrumed on said anchor plate and having one end engaging said thrust cap and the opposite end connected to said toggle linkage, and means for moving said thrust cap.

12. The combination of an axle, a substantially vertical trunnion carried by said axle and having a screw threaded portion, a wheel swiveled on said trunnion, a brake drum moving with said wheel, a brake band co-acting with said drum, a toggle linkage interposed between the free ends of said brake band, a thrust cap mounted on said trunnion for movement radially with respect to said brake band, said thrust cap having internal screw threads fitting the screw threaded portion of the trunnion, a lever having one end engaging said thrust cap and the opposite end connected to said toggle linkage, and means for rotating said thrust cap.

13. The combination of an axle, a substantially vertical trunnion carried by said axle and having a screw threaded portion, a wheel swiveled on said trunnion, a brake drum moving with said wheel, a brake band co-acting with said drum, a toggle linkage interposed between the free ends of said brake band, a thrust cap mounted on said trunnion and having internal screw threads fitting the screw threaded portion of the trunnion, a lever having one end engaging said thrust cap and the opposite end connected to said toggle linkage, a spring connected to the end of said lever which engages the thrust cap, and means for rotating said thrust cap.

14. The combination of an axle, a substantially vertical trunnion carried by said axle and having a screw threaded portion, a wheel swiveled on said trunnion, a brake drum moving with said wheel, a brake band co-acting with said drum, a toggle linkage interposed between the free ends of said brake band, a thrust cap mounted on said trunnion for movement radially with respect to said brake band, said thrust cap having internal screw threads fitting the screw threaded portion of the trunnion, a lever having one end engaging said thrust cap, a link connecting the opposite end of said lever and the toggle linkage, and means for rotating said thrust cap.

15. The combination of an axle, a substantially vertical trunnion carried by said axle and having a screw threaded portion, a hub support swiveled on said trunnion, a wheel journaled on said hub support to rotate about a substantially horizontal axis, a brake drum moving with said wheel, a brake band having means thereon affording a limited circumferential movement with respect to and co-acting with said drum, a toggle linkage interposed between the free ends of said band, a thrust cap mounted on said trunnion and having internal screw threads fitting the screw threaded portion of the trunnion, an anchor plate secured to the hub support and having portions constituting abutments adapted to be engaged by parts of the brake band, a lever fulcrumed on said anchor plate and having one end engaging the thrust cap and the other end connected to said toggle linkage, and means for rotating said thrust cap.

16. The combination of an axle, a substantially vertical trunnion carried by said axle and having a screw threaded portion, a hub support swiveled on said trunnion, a wheel journaled on said hub support to rotate about a substantially horizontal axle, a brake drum moving with said wheel, a brake band co-acting with said drum, a toggle linkage interposed between the free ends of said band, a thrust cap mounted on said trunnion and having internal screw threads fitting the screw threaded portion of the trunnion, an anchor plate secured to the hub support and having portions constituting abutments adapted to be engaged by parts of the brake band, a lever fulcrumed on said anchor plate and having one end engaging said thrust cap, a link connecting the opposite end of said lever with said toggle linkage, spring means for normally holding the brake band in a position such that it engages one of said abutments, and means for rotating the said thrust cap.

17. The combination of an axle, a substantially vertical trunnion carried by said axle and having a screw threaded portion, a hub support swiveled on said trunnion, a wheel journaled on said hub support, a brake drum moving with said wheel, a brake band co-acting with said drum, a toggle linkage interposed between the free ends of said band, a thrust cap mounted on said trunnion and having internal screw threads fitting the screw threaded portion of the trunnion, an anchor plate secured to the hub support and having portions constituting abutments adapted to be engaged by parts of the brake band, a lever having one end engaging said thrust cap, a link connecting the opposite end of said lever with said toggle linkage, a spring connecting said link with a part fixed with respect to the anchor plate, and means for rotating said thrust cap.

18. In a braking mechanism, the combination of a brake drum, a brake band co-acting therewith, and means for actuating said brake band including a rotatable thrust cap, and an operating arm adjustably connected to said thrust cap, said arm having a portion thereof offset with respect to said thrust cap and serrated for engagement with a correspondingly serrated part carried by said thrust cap.

19. In a braking mechanism, the combination of a brake drum, a brake band co-acting therewith, and means for actuating said brake band including a rotatable thrust cap, a member secured to said cap and provided with a serrated portion having a slot therein, an operating arm journaled on said thrust cap and provided with a stud extending through said slot, and means for clamping said operating arm to said member.

In testimony whereof, we affix our signatures.

EARL J. W. RAGSDALE.
GUSTAVE A. HAEDERER.